US012579454B2

(12) United States Patent (10) Patent No.: US 12,579,454 B2
Szczepanik et al. (45) Date of Patent: Mar. 17, 2026

(54) PROVIDING EXPLAINABLE MACHINE LEARNING MODEL RESULTS USING DISTRIBUTED LEDGERS

(71) Applicant: International Business Machines Corporation, Armonk, NY (US)

(72) Inventors: Grzegorz Piotr Szczepanik, Cracow (PL); Lukasz Jakub Palus, Cracow (PL); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 986 days.

(21) Appl. No.: 17/126,091

(22) Filed: Dec. 18, 2020

(65) Prior Publication Data

US 2022/0198304 A1 Jun. 23, 2022

(51) Int. Cl.
*G06N 5/045* (2023.01)
*G06F 16/2458* (2019.01)
*G06N 20/00* (2019.01)
*H04L 9/32* (2006.01)
*H04L 9/00* (2022.01)

(52) U.S. Cl.
CPC ......... *G06N 5/045* (2013.01); *G06F 16/2474* (2019.01); *G06N 20/00* (2019.01); *H04L 9/3236* (2013.01); *H04L 9/50* (2022.05)

(58) Field of Classification Search
CPC .... G06N 5/045; G06N 20/00; G06F 16/2474; H04L 9/50
See application file for complete search history.

(56) References Cited

U.S. PATENT DOCUMENTS

| | | | |
|---|---|---|---|
| 11,625,561 B2 | 4/2023 | Kuwajima et al. | |
| 11,868,911 B1 * | 1/2024 | Almasan | G06F 16/2255 |
| 2018/0089593 A1 | 3/2018 | Patel | |
| 2019/0130545 A1 | 5/2019 | Cardei | |
| 2020/0327969 A1 | 10/2020 | Malvankar et al. | |
| 2021/0133721 A1 * | 5/2021 | Ponceleon | H04L 9/50 |
| 2021/0174258 A1 * | 6/2021 | Wenchel | G06N 20/00 |

(Continued)

FOREIGN PATENT DOCUMENTS

| | | |
|---|---|---|
| CA | 2938758 A1 | 2/2017 |
| CN | 108898219 A | 11/2018 |
| CN | 109615015 A | 4/2019 |

(Continued)

OTHER PUBLICATIONS

International Search Report and Written Opinion dated Jan. 27, 2022 from International Application No. PCT/CN2021/130936 filed Nov. 27, 2022.

(Continued)

*Primary Examiner* — Kyle R Stork
(74) *Attorney, Agent, or Firm* — David K. Mattheis

(57) ABSTRACT

Providing reproducible machine learning model results by receiving input data for a machine learning (ML) model, processing the input data using the ML model, yielding an initial result, adding a first block to a distributed ledger, the block comprising the input data, the initial result, an ML model data structure, and a link to training data for the ML model, wherein the training data resides in previous distributed ledger blocks, and providing an output including the initial result.

17 Claims, 5 Drawing Sheets

START

RECEIVE INPUT DATA 210

PROCESS THE INPUT DATA 220

GENERATE / ADD NEW BLOCK 230

PROVIDE RESULTS OUTPUT 240

RECEIVE VALIDATION REQUEST 250

RETRIEVE INPUT DATA AND MODEL 260

PROCESS VALIDATION 270

PROVIDE VALIDATION OUTPUT 280

200

(56)          References Cited

U.S. PATENT DOCUMENTS

2023/0353531 A1    11/2023  Khan et al.

FOREIGN PATENT DOCUMENTS

| | | | |
|---|---|---|---|
| CN | 109670583 A | 4/2019 | |
| CN | 110490305 * | 11/2019 | .............. G06N 3/08 |
| CN | 110991622 A | 4/2020 | |
| CN | 111356995 A | 6/2020 | |
| CN | 111832606 A | 10/2020 | |
| CN | 116601644 A | 8/2023 | |
| GB | 2617945 A | 10/2023 | |
| JP | 2019-082883 A | 5/2019 | |
| JP | 2020-046738 A | 3/2020 | |
| JP | 2023-553676 A | 12/2023 | |
| WO | 2016029119 A1 | 2/2016 | |
| WO | 2017040313 A1 | 3/2017 | |
| WO | 2020/157939 A1 | 8/2020 | |
| WO | 2022/127474 A1 | 6/2022 | |

OTHER PUBLICATIONS

"Blockchain Technology and Applications", Microsoft Azure, 14 pages, <https://azure.microsoft.com/en-in/solutions/blockchain/>.
"Combining blockchain and artificial intelligence for a better future", The Modex Team, Aug. 13, 2018, 5 pages.

"Metadata Matters—How Metadata Can Help Media Companies Succeed", Bloomberg Content Service, 15 pages, © 2014 Bloomberg L.P., <https://data.bloomberglp.com/mld/sites/6/2015/08/140814-Metadata-Whitepaper.pdf >.
Asharaf et al., "Decentralized Computing Using Blockchain Technologies and Smart Contracts: Emerging Research and Opportunities", Book Abstract, Jan. 2017, 3 pages.
Banafa, Ahmed, "Blockchain and AI: A Perfect Match?", Linked In, downloaded from the Internet on Oct. 12, 2020, 5 pages, <https://www.linkedin.com/pulse/blockchain-ai-perfect-match-ahmed-banafa/>.
Cuomo, Jerry, How blockchain adds trust to AI and IoT, Blockchain Pulse: IBM, Aug. 5, 2020, 8 pages.
Ghanta et al., "Interpretability and Reproducability in Production Machine Learning Applications", 2018 17th IEEE International Conference on Machine Learning and Applications, pp. 658-664, DOI 10.1109/ICMLA.2018.00105.
Mell et al., "The NIST Definition of Cloud Computing", Recommendations of the National Institute of Standards and Technology, Special Publication 800-145, Sep. 2011, 7 pages.
Nassar et al., "Blockchain for explainable and trustworthy artificial intelligence", WIREs Data Mining and Knowledge Discovery, Accepted: Sep. 4, 2019, 14 pages, DOI: 10.1002/widm.1340.
Japanese Patent Office, "Notice of Allowance", Mar. 6, 2025, 5 pages, Application No. JP2023-536415.
The State Intellectual Property Office of People's Republic of China, "First Office Action", Sep. 9, 2025, 18 Pages, CN Application No. 202180081844.1.

\* cited by examiner

NETWORKED COMPUTER SYSTEM, 1000

CLIENT, 104

NETWORK 114

CLIENT, 110

SERVER SUB-SYSTEM, 102

SERVER COMPUTER, 150

COMMUNICATIONS UNIT, 152

MEMORY, 158

RAM, 160

PERSISTENT STORAGE, 170

PROCESSOR SET, 154

CACHE, 162

PROGRAM, 175

I/O INTERFACE SET, 156

140

DISPLAY, 180

EXTERNAL DEVICES, 190

PROVIDING EXPLAINABLE MACHINE LEARNING MODEL RESULTS USING DISTRIBUTED LEDGERS

BACKGROUND

The disclosure relates generally to providing explainable machine learning model results. The disclosure relates particularly to providing explainable machine learning model results over the maturation of the machine learning model.

Machines are becoming intelligent. These machines serve humans in a smart way through intangible interfaces (Cognitive devices which can communicate with humans in natural language) but also through tangible interfaces (Robots or other tangible interfaces). Cognitive interfaces possess machine intelligence and have the ability to process input data and are also able to get additional information from resources for more appropriate processing communicating with other devices.

Modern complex artificial intelligence (AI) techniques, such as deep learning and genetic algorithms are naturally opaque. The AI systems are actively dependent on the training corpus and learn from it to judge in more natural ways. This ongoing learning improves the AI systems' performance day-by-day based on more associated learnings and history. Sometimes, AI systems learn undesirable classification pathways because of the complexity of the machine learning (ML) models. These undesirable classification pathways result in interpretability problems for the AI results.

For black box-type ML models, the stakeholders cannot explain why the AI arrived at a specific decision. Hence, there is little data to justify the information and results generated by an AI system. Explainable AI (XAI) refers to methods and techniques in the application of artificial intelligence technology (AI) such that the results of the model can be explained and understood by human experts. XAI provides explainability and interpretability of ML model results. XAI models generate a lot of metadata to provide the necessary explanation and evidence, that can be validated manually, to provide an end user the desired confidence level in the ML model results. The XAI gives a score explaining how each input factor contributed to the final result of the model predictions. This supports a "Safe AI" concept by which humans can see what is being decided inside the AI ML model. ML models which do not provide for such explanations may not be adaptable for business-critical decisions.

In typical ML models, the major contributor to generate an output or set of outputs is the corpus used for training the model. As the model processes data, it generates results and appends the metadata mapper objects associated with the results to the training corpus. These metadata mapper objects include information derived during generation of first set of outputs. As the ML model learns more, it becomes more mature because of metadata backfills to the training corpus generated as byproduct of the current and prior runs.

The day-by-day maturing of the ML model affects the outputs generated by the ML model derived using the evolving indices of the ML model. As a result, the same set of input data can generate different outputs at different times based on the maturing of the ML model. Further, there may be no means to retroactively validate or explain an output from an ML model after a period of time due to changes in the maturing model.

As an example, there is no mechanism that can validate and explain how a previous result from an ML model satisfies anti-discrimination regulations once the model has matured and changed its state. The dynamic state of an ML model changes based on the evolution of the model's training corpus. Hence, there is no way to audit the ML model decisions after time has passed when the decisions are not saved in a proper way. Further, there is no way by which multi-fold validation can be performed after a considerable period of time. There are mechanisms to save the intermediate outcomes of ML models as part of test validation proofs, but the size of model outcomes and training corpus sets becomes unmanageable in cases where there are multiple ML models using a common training corpus, wherein the multiple ML models each generate a number of intermediate outcome data.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable providing explainable and reproducible machine learning model results.

Aspects of the invention disclose methods, systems and computer readable media associated with providing reproducible machine learning model results by receiving input data for a machine learning model, processing the input data using the machine learning model, yielding an initial result, adding a first block to a distributed ledger, the block including the input data, the initial result, an ML model data structure and a link to training data for the ML model, wherein the training data resides in previous distributed ledger blocks, and providing an output including the initial result. This method provides a distributed immutable tracking of the ML model revolution and enables auditing and validation of past ML model results.

Aspects of the invention disclose methods, systems and computer readable media associated with providing reproducible machine learning model results by receiving input data for a machine learning model, processing the input data using the machine learning model, yielding an initial result, adding a first block to a distributed ledger, the block including the input data, the initial result, an ML model data structure and a link to training data for the ML model, wherein the training data resides in previous distributed ledger blocks, receiving a result validation request relating to the input data, retrieving the input data and ML model data structure from the first block, processing the input data using the ML model data structure, yielding a validation result, and providing an output including the initial result and the validation result. This method provides a distributed immutable tracking of the ML model revolution and enables auditing and validation of past ML model results.

Aspects of the invention disclose methods, systems and computer readable media associated with providing reproducible machine learning model results by receiving input data for a machine learning model, processing the input data using the machine learning model, yielding an initial result, determining an ML model explanation associated with the initial result, adding a first block to a distributed ledger, the block including the input data, the initial result, the ML model explanation, an ML model data structure, and a link to training data for the ML model, wherein the training data resides in previous distributed ledger blocks, and providing an output including the initial result and the ML model explanation. This method provides a distributed immutable tracking of the ML model revolution and enables explanation, auditing and validation of past ML model results.

Aspects of the invention disclose methods, systems and computer readable media associated with providing reproducible machine learning model results by receiving input data for a machine learning model, processing the input data using the machine learning model, yielding an initial result, adding a first block to a distributed ledger, the block including the input data, the initial result, an ML model data structure and a link to training data for the ML model, wherein the training data resides in previous distributed ledger blocks, providing an output including the initial result, updating the ML model using the input data and result, yielding a new ML model version, and adding a second block to the distributed ledger wherein the second block comprises a label associated with the new ML model version, the input data, the initial result, the ML model data structure, and a link to training data for a previous version ML model. This method provides a distributed immutable tracking of the ML model revolution and enables auditing and validation of past ML model results.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
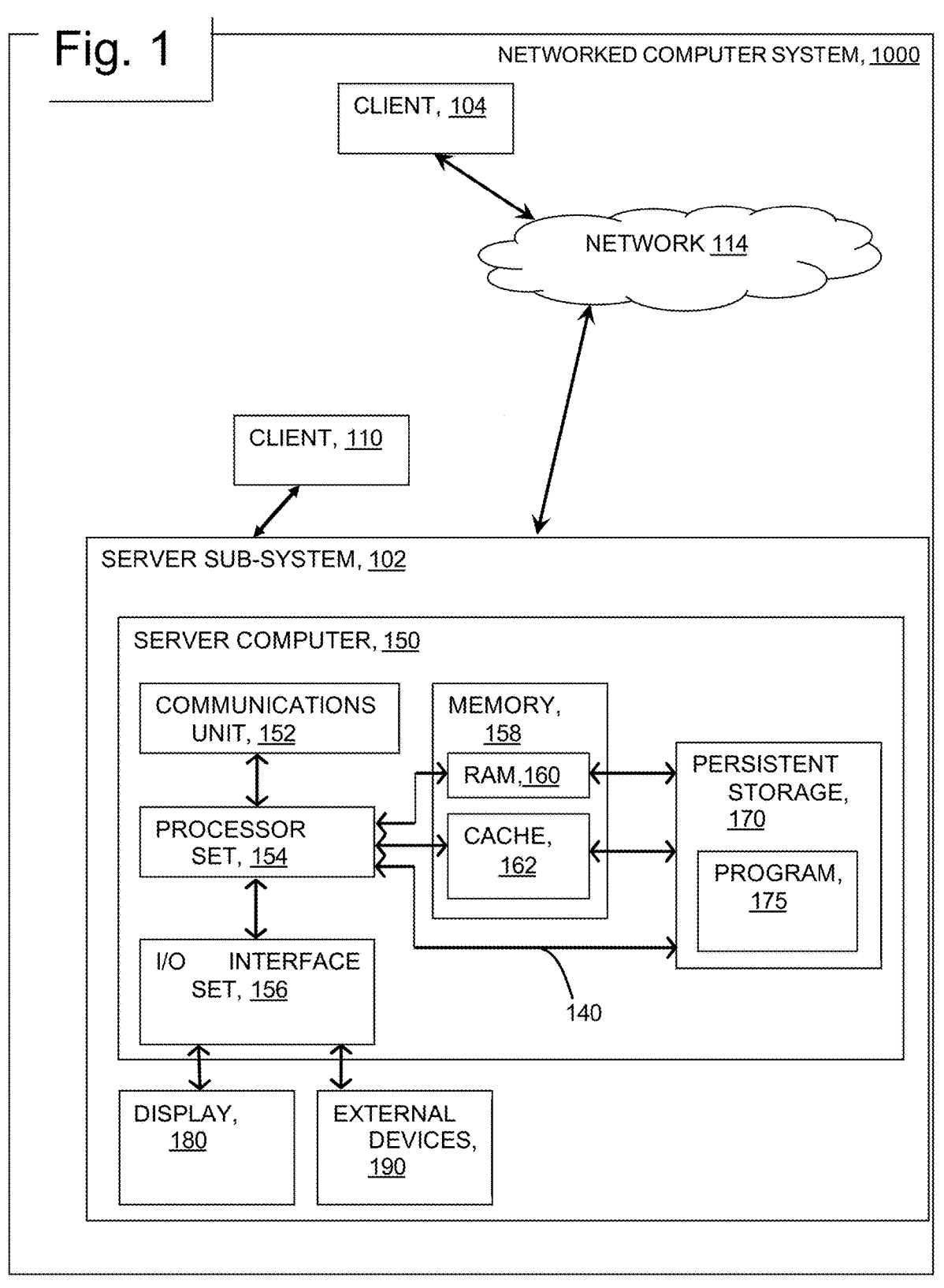
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Disclosed embodiments address the problem of explainability and reproducibility of machine learning model results. Embodiments enable the re-generation of the results produced during earlier implementations of the model and offer a mechanism to validate the time-based ML model outputs. Disclosed embodiments include a blockchain ledger as one of the intermediate components. After receiving input data from various entities, such as static and dynamic computing platforms associated with the ML model, disclosed embodiments create a block on the blockchain ledger and generate appropriate linking with existing blocks in the ledger. Disclosed embodiments include a producer-consumer architecture with the help of blockchain ledger, where the entities participating in ML model computation are the blockchain stakeholders.

At the time of computing a ML model output for given set of problem and input information, a producer engine in the implementation creates the block over the distributed ledger and updates the ML model with a PRODUCTION signal. In response to this, an implemented consumer daemon mechanism in the ML model collects the associated training corpus data, or previous ML model version and node weightings, from the ledger, and the trained ML model is applied to the input data. The consumer has a clear understanding of the respective stakeholders participating in the computation. The consumer daemon associated with the ledger and the ML model writes the intermediate results to the ledger. Many ML models implement pass-oriented architecture wherein multiple intermediate data-structures are generated and posted to the ledger.

In an embodiment, the ML model creates the block over ledger architecture for intermediate results, tags all the participants-stakeholders and saves the data associated with the current ML version and the outputs associated with the current inputs. While the input stakeholder data is directly written to the ledger for consumer processing, the training corpus data is collected from existing blocks created during prior runs of the ML model. While fetching the training corpus, the ML model collects the flags or data location links (tagging data) along with the actual training corpus datasets. Disclosed embodiments create the new ML model version data structure, and the ML model history is updated while retaining the older links in the object. This retention of links to the older training corpus tagging gives reverse traceability to the tagging corpus, enabling recreation of the ML model if necessary or requested.

When any ML model needs to be validated after the maturing indices are changed, the disclosed embodiments utilize a special FLAG of reproducibility which activates the cognitive system's reproducibility at the consumer instance of the ML model. The consumer daemon at the ML model selects the tagged training corpus data over the ledger and accordingly traverses the associated time-based stakeholder input data. Once this input data is collected, disclosed embodiments fetch the training corpus by traversing the ledger tagging data structures and tracing links based on time of execution of prior runs. Consumer/user and producer daemons refer to utility program portions of the disclosed methods. These utility program portions carry out disclosed method activities for the consumer/user and producer, respectively. Such steps include generating/signing ledger entries associated with inputs and outputs, generating/signing blocks including relevant ledger entries, requesting output validation as well as retrieving and utilizing the ML model components necessary to carry out the validation/audit.

Explanations of ML model results, audit trails in the ledger, and the ML model can be validated using exactly the same training corpus and ML model data structure used to output the original results. At each confidence level of reporting/output from the data model, disclosed methods invoke an explainablity module. This module creates a block on the blockchain to update the current state of the model along with the associated explanation. After providing a decision/output, an audit trail of all the data sources used, data structure of the ML model used, the ML model training corpus, and also the midway confidence explanations etc. is created for the decision. Disclosed methods use smart contracts or manual controls to course correct the model and create an audit trail of such adjustments.

In an embodiment, one or more components of the system can employ hardware and/or software to solve problems that are highly technical in nature (e.g., processing input data using a trained machine learning model, adding a block to a distributed ledger, the block including input data, the machine learning model data structure, intermediate model results, model explanations, and tags to model training corpus locations in the distributed ledger, providing model processing results etc.). These solutions are not abstract and cannot be performed as a set of mental acts by a human due to the processing capabilities needed to facilitate reproducible and explainable machine learning model results, for example. Further, some of the processes performed may be performed by a specialized computer for carrying out defined tasks related to explainable and reproducible machine learning model results. For example, a specialized computer can be employed to carry out tasks related to reproducible and explainable machine learning model results accessible across a distributed ledger to participating stakeholders, or the like.

In an embodiment, the method for AI data governance and explainability receives input data. The input data relates to the intended use of the trained machine learning model, such as a pass-fail classification based upon the current node weightings of the model and the processing of the input data. A user inputs data as a digitally signed ledger entry linking the user, the data, and the producer. The ledger entry includes the digital signature of the user as well as the public keys of the user and producer. In an embodiment, the producer receives input data from a user. In this embodiment, the producer creates and signs the ledger entry.

The ledger entry includes the input data, the user's public key, the producer's public key and the digital signature of the producer. The ledger entry may include identification data for the user, the producer, or both the user and the producer. The method processes the input data using the trained model and yields a result—such as a pass or fail classification of the input data. As an example, a simple linear regression model receives a dataset provided as input and generates an output including attributes for the input record. The input data and output from the model are captured together as a submitted ledger entry which is authenticated by blockchain user consensus and subsequently added to a new block of the blockchain. Consensus-based authentication of submitted ledger entries using digital signatures and available public keys, prior to adding them to the ledger and blockchain preserves the integrity of the ledger.

After determining the result for the input data, the method creates a new block for a distributed ledger such as a blockchain. The blockchain may be a private blockchain ledger where the identities of the participants are known to each other, or a more public distributed ledger where the identities of participants are shielded. The blockchain may be created using the open source HYPERLEDGER or ETHEREUM blockchain scripting platforms, or other blockchain platforms. (Note: the terms "HYPERLEDGER" and "ETHEREUM" may be subject to trademark rights in various jurisdictions throughout the world and are used here only in reference to the products or services properly denominated by the marks to the extent that such trademark rights may exist.)

Each participant has an identification (ID), a public-private key pair, and a digital signature. The participant's digital signature may be based upon the public-private cryptographic key pair. The id may include the public key of the participant. The combination of the id and digital signature may be used to authenticate any transaction. In an embodiment, each transaction carries a transaction id, the originator id and the originator's digital signature which is encoded using the private key of the originator and the transaction id. The originator id, or originator public key, may then be used to decrypt the transaction id from the digital signature authenticating the origin of the transaction.

The use of the public—private key pair enables participants to validate entries to the ledger made and signed using a digital signature, such as input data ledger entries signed by a user and ML model results entries signed by a producer. Entries may be validated without knowledge of the originator's identity. In an embodiment, the size of each block is predetermined. When the predetermined size limit is reached, a new block is created incorporating a hash of the previous block. In this embodiment, the method creates a new block with each result during the processing. The method creates blocks for each intermediate result as well as a block for the final result of the processing.

In one embodiment, the method creates ledger entries for each intermediate result and creates a new block after determining the final result. The created block includes the user's identification, the intermediate and/or final result, and the version or data structure of the machine learning model used to achieve the result—such as the current matrix of node weightings for the model. The block also includes one or more tags. Each tag provides information about the location of the data used as the training corpus for the current version of the machine learning model. The tag(s) point to previous blocks of the distributed ledger where the training corpus data are stored. The block further includes one or more ledger entries linking the stakeholders of the current result, such as the user entity who provides the input data and a producer entity who holds the ML model and utilizes the determined result for a decision involving the user entity. The ledger entries include a smart contract entry. The smart contract enables each of the user and the producer to validate and reproduce the results using the proper version of the machine learning model. In an embodiment, the smart contract further enables the re-creation or retraining of the machine learning model using the tagged training corpus data retrieved from previous blocks of the ledger. The smart contract may include conditions which must be satisfied to generate the validation of the previous results. Such conditions may include agreement from each of the producer and user to generate the validation results.

In an embodiment, the method generates an XAI explanation at least for the final result and in some embodiments, for each intermediate ML model result as well as the final result. The method generates XAI explanations using XAI methodologies. The XAI explanations provide information on the relative weightings for each piece of the input data relative to the determined result, thereby explaining the effect each piece of input data had on the result. For example, for a set of input data including n data points, the XAI explanation indicates whether each of the n data points contributed positively or negatively to the result, for a pass result, whether each data point added to the determination of the pass result of detracted from that determination. The XAI explanation further include the relative weightings of the set of n data points from the highest weighted and most influential to the lowest weighted and least influential. In this embodiment, the method further includes the XAI explanation data in the block created for the result(s).

In an embodiment, each created block includes a hash value derived from all previous blocks of the ledger. In this embodiment, the method uses a hash function such as SHA-256 to generate the hash value from the previous blocks. In this embodiment, the block is signed using the producer's private key-based digital signature. Consensus validation of the block occurs through the user and other participants validating the digital signature using the public key of the producer.

In an embodiment, the method provides the user and producer the determined results as an output. The method may further provide the user and producer with an indication of the ledger entries and block(s) which memorialize their results determination transaction.

Over time, and across the generation of numerous results, the data structure such as ML model node weightings evolves. The method adds each combination of input data and determined results to expand the training corpus for the model. As the training corpus expands, the model data structure evolves, and new versions of the model are created. In an embodiment, the method memorializes each new version with a created block including ledger entries for the model version number and associated data structure. The entries further include tags to the expanded training corpus used to derive the new data structure.

After the evolution, or maturing, of the ML model data structure, the method adds appropriate ledger entries and blocks memorializing the evolution of the training corpus and ML model data structure to the blockchain. Subsequent to this addition, a user, producer, or other stakeholder, may seek to reproduce and validate the previous results. As the model version and data structure have evolved, reproducing the previous result requires the use of the model version used initially rather than the current version. As stakeholders associated with the desired result through the relevant ledger entry, either the user, producer or other associated stakeholder, can request validation and reproduction of the result(s). The requesting stakeholder submits a request signed with their digital signature. In an embodiment, the method validates the digital signature of the request using the public key of the stakeholder.

After validating the signature, the method retrieves the data relevant to the validation request from the blocks of the blockchain. The method retrieves the relevant user input data, model version and data structure, training corpus links, the original intermediate and final results, and the associated XAI explanations from the appropriate block(s), in order to complete the validation request. Completing the validation request includes re-processing the input data using the ML model data structure yielding validation intermediate and final results. The method then compares the original and validation intermediate and final results. In an embodiment, the method further compares the original and validation XAI explanations. The original and validation results and XAI explanations should be identical as the method processes the original input data using the original, ML version and data structure. The method provides the original and validation results to the validation requestor.

In an embodiment, the method processes the retrieved input data using the model according to the retrieved model data structure and verifies that the retrieved ML model determines the same result(s) and the same explanation(s). In an embodiment, the method further retrieves the training corpus data using the tags. In this embodiment, the method recreates the ML model using the retrieved training corpus to validate that the training corpus yields the retrieved ML model data structure associated with the retrieved model version. The method provides the outputs of the requested results validation to the requestor of the validation. In an embodiment, the method creates a ledger entry documenting the request and associated output for the validation as well as the outcome of the validation—results repeated, or validation failed results not repeated. In an embodiment, the method provides notice of the request for validation and the outputs of the requested validation to all stakeholders associated with the results. In this embodiment, all method step are memorialized in associated ledger entries incorporated into the next new block.

Disclosed embodiments enable the auditing, validation, and replication of ML model results as a means of satisfying regulatory requirements relating to the use of ML models for making pass-fail decision or other uses. The disclosed embodiments provide a replica of the ML model used in determining the initial results through the ML model data structure, provide a means of re-creating the ML model data structure using the original data corpus to verify the raining, and provides XAI explanations of model decisions to satisfy regulatory requirements regarding ML model transparency.

In an embodiment, a producer may manually intervene in the determination of the model result, shifting a model determination from fail to pass for example. Such an intervention requires a proper digital signature from the producer for the intervention. In this embodiment, the method validates the digital signature using the public key of the producer, makes the requested change and tracks the manual intervention and its effect upon the data structure of the model. The method memorializes this effect as a new version of the model in ledger entries documenting the manual intervention and alteration of result(s). The method creates a new block capturing the ledger entries associated with the intervention. The method adds a tag to the manual result as part of the training corpus for this version of the model as well as all subsequent versions. In an embodiment, the method adds the tag to the ledger entry associated with the intervention.

In an embodiment, the method retrains the ML model using the manual intervention results and associated input data, generating a modified version of the ML model and an associated modified data structure. The method labels the new ML version and memorializes the new version, data structure, and training corpus including what is effectively labeled input data—the input data and manual intervention result. The method generates new ledger entries and an associated new block including the new version, input data, manual intervention result label, version label, an indication of the manual intervention, etc. The producer signs the new block and submits it for consensus validation based upon the signature.

In an embodiment, the method includes one or more application program interfaces (APIs) for the method stakeholders to provide input data, submit audit or validation requests and to receive output data from the model. The APIs link stakeholders to the ledger and the state machine built using the model and training corpus. The APIs provide pathways for user input data and producer direct/manual intervention data to the state machine. The APIs provide the means for the generation of new ledger entries and new blocks memorializing model results and tagging model training corpus data locations in previous blocks. The APIs further enable the generation of ledger entry smart contracts linking stakeholders to their common results.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise application program interfaces (not shown) associated with disclosed embodiments, together with sufficient computing resource (processor, memory, network communications hardware) to execute the program.

In an embodiment, client devices 104 and 110 include users and producers associated with disclosed systems and methods. The user and producers connect via network 114 to provide input data, generate results using the ML model and create, validate, and add blocks to the blockchain.

As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the data governance and XAI program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., data governance and XAI program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
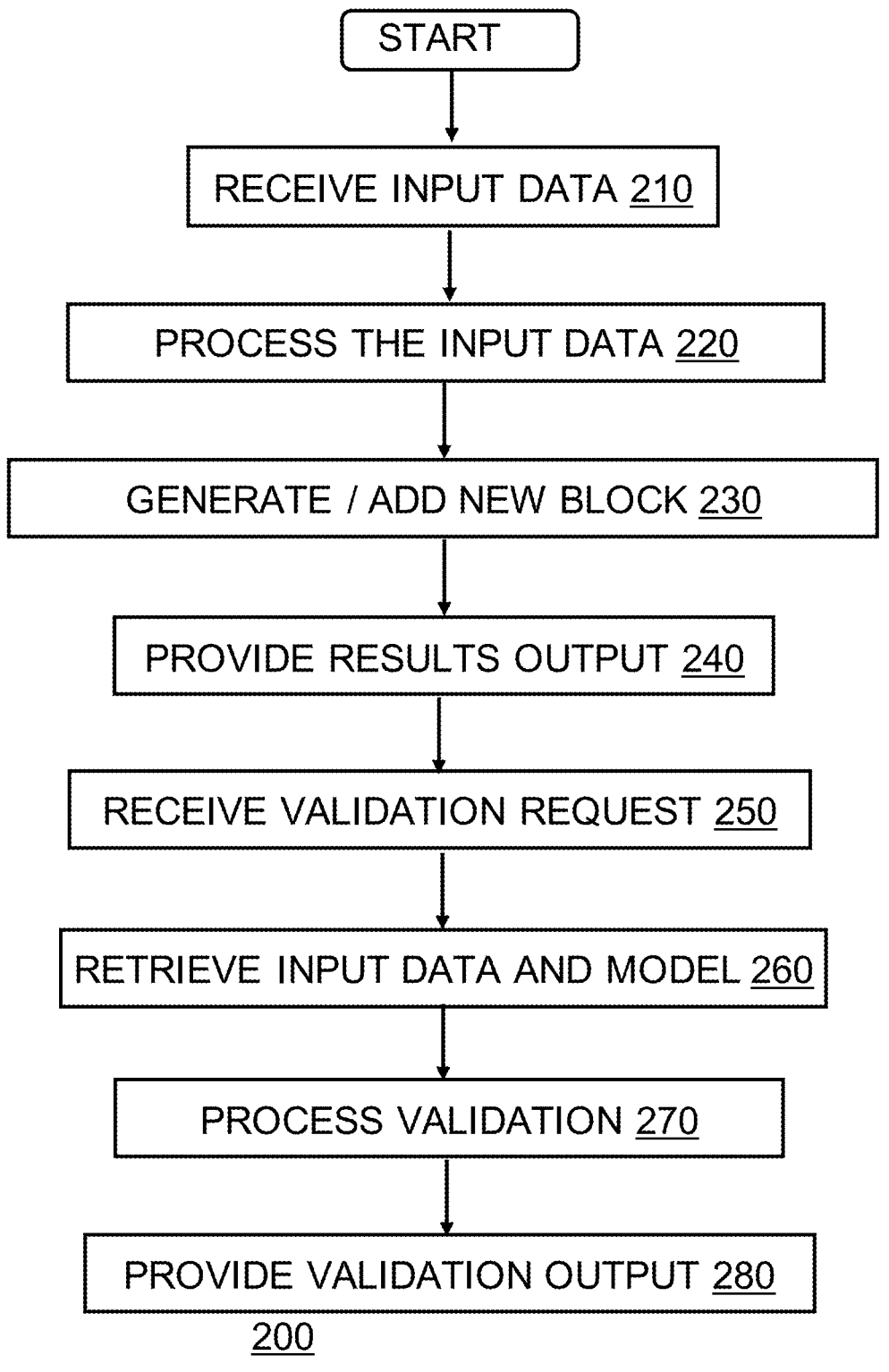
FIG. 2 provides a flowchart depicting an operational sequence, according to an embodiment of the invention.

FIG. 2 provides a flowchart 200, illustrating exemplary activities associated with the practice of the disclosure. After program start, at block 210 the XAI data governance program 175 receives input data. The input data may be passed to the program through an API from a stakeholder such as a user or producer. The input data may be passed as a ledger entry digitally signed by the data provider and including public keys for all stakeholders to the associated transaction.

At block 220, the method of XAI data governance program 175 processes the input data from the ledger entry using a trained ML model. The ML model includes a data structure derived during the training of the model using a training corpus of data. The ML model include a model version indicator. Processing the input data yields one or more results associated with the input data, such as one or more pass-fail results associated with an underlying transaction between a user and a producer. The results may include XAI explanations for the final results and any intermediate results generated during the processing of the input data by the ML model. The XAI explanations enable a human to interpret and explain the results provided as output by the model. In an embodiment, the XAI results include the relative weightings of the input data used in determining the results.

At block 230, the method of XAI data governance program 175 adds ledger entries to a distributed ledger. The ledger entries include identification of the stakeholders to a processing event as well as smart contract terms setting forth the conditions necessary for a stakeholder to access the results or to request an audit or other validation of the results. Additional ledger entries include the originating ledger entry including the input data, as well as entries including the ML model version indicator, the ML model data structure and tags identifying the underlying training corpus of the ML model and the blocks of the distributed ledger blockchain where the training corpus data resides. The method further generates a new block for the blockchain. The new block includes the new ledger entries as well as a hash of the previous blocks of the blockchain. The producer signs the new block using a digital signature derived using the private key of the producer. The method adds the new block after consensus validation of the block by stakeholders. The stakeholders validate the new block using the public key of the producer to validate the digital signature of the new block.

The method adds the input data and associated results to the training corpus of the ML model and retrains the ML model using the amended training corpus. The method notes a new version of the ML model and new version of the ML model data structure and tags the additional training corpus data as part of the overall training corpus.

At block 240, the method of XAI data governance program 175 provides the results of the processing including direct pass-fail type results in addition to XAI explanations of those results. The method may provide results to any combination of the user, the producer and other stakeholders identified in the originating ledger entry.

At block 250, the method of XAI data governance program 175 receives a request for validation or audit associated with previous results or input data. The request satisfies requirements for requesting the validation set forth in a ledger entry smart contract for the input data. The method validates the signature of the validation requestor and proceeds with completing the validation or audit request.

At block 260, the method of XAI data governance program 175 retrieves the input data, original results, XAI explanations, ML model version and associated ML data structure, and ML model version training data set location tags from the relevant ledger entry or entries of the previously added block. At block 270, the method processes the input data using the ML version based upon the retrieved data structure and determines new intermediate and final results as well as XAI explanations for those new results.

At block 280, the method provides the result of the validation including the original results and XAI explanations, and the new results and XAI explanations, to the requestor of the validation and in some instance to all other stakeholders to the transaction. Providing both the original and new results enables comparison of the two sets of results by the validation requestor. Providing the XAI explanation results for the original and new results enables an audit of the weightings of input data used in determining the results.

Figure 3:
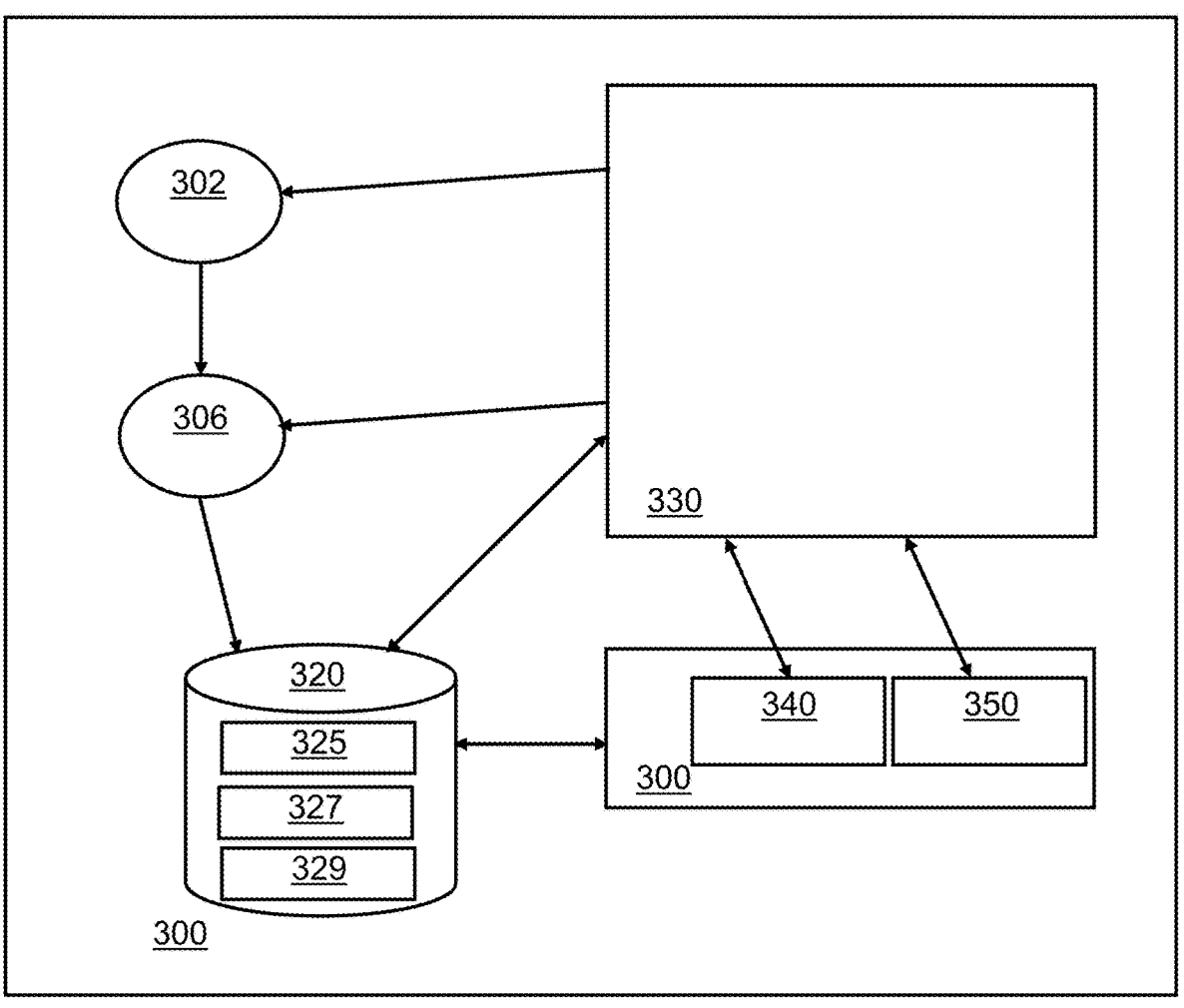
FIG. 3 provides a schematic illustration of data flow, according to an embodiment of the invention.

FIG. 3 provides a schematic illustration 300 of the data flow according to an embodiment of the invention. As shown in the Figure, input data flows from a user 302 to a producer 306 to the distributed ledger state machine 320, as a digitally signed ledger entry 325. The method of XAI data governance program 175 of FIG. 1 passes the ledger entry 325 to ML model 330. ML model 330 processes the ledger entry 325 input data and returns results including a classification for the input data (such as pass or fail), as well as returning XAI explanations for all intermediate and final ML model results. The output results and links between the stakeholders (user 302, producer 306, etc.) associated with the outputs are documented in ledger entries 327 along with the XAI explanations of the results. Smart contract ledger entries 329 set forth the conditions for stakeholder access to the results and explanations, as well as conditions for requesting validation or an audit of the results by the stakeholders. ML model 330 provides the results and XAI explanations as outputs through APIs to transaction stakeholders including user 302 and producer 306.

The method of XAI data governance program 175 creates a new block 340 for the distributed ledger blockchain and signs the new block using the digital signature of the producer. The new block includes the originating ledger entry, the results ledger entry, ML model data structure and version label, and smart contract ledger entries. The new block is added to the blockchain and validated by a consensus of blockchain stakeholders using the public key of the producer.

The method of XAI data governance program 175 appends the input data and associated results to the training corpus and trains/generates a new model version having a revised data structure using the appended training corpus data set. Ledger entries indicating the new version, revised ML model data structure, and additional training set tags are generated, and another new block 350 is created memorializing these ledger entries. Model 330 reads blocks ledger entries 325, 327, and 329 captured in blocks 340 and 350, as needed for validation of previous results.

Implementation of disclosed embodiment may utilize local or networked computing resources. In an embodiment, local resources connect to edge cloud or cloud resources to leverage additional computing resource available through such connections.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
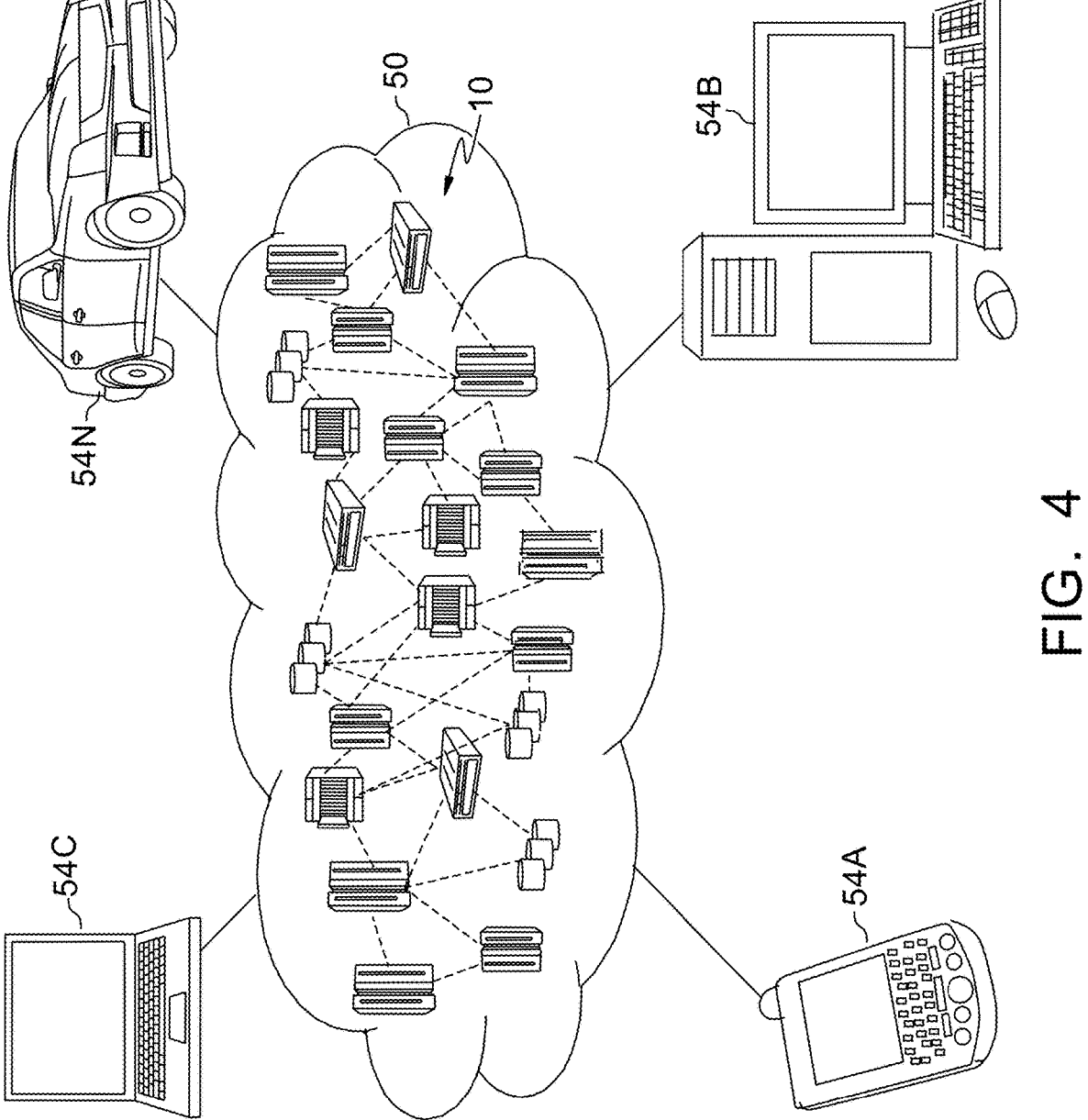
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
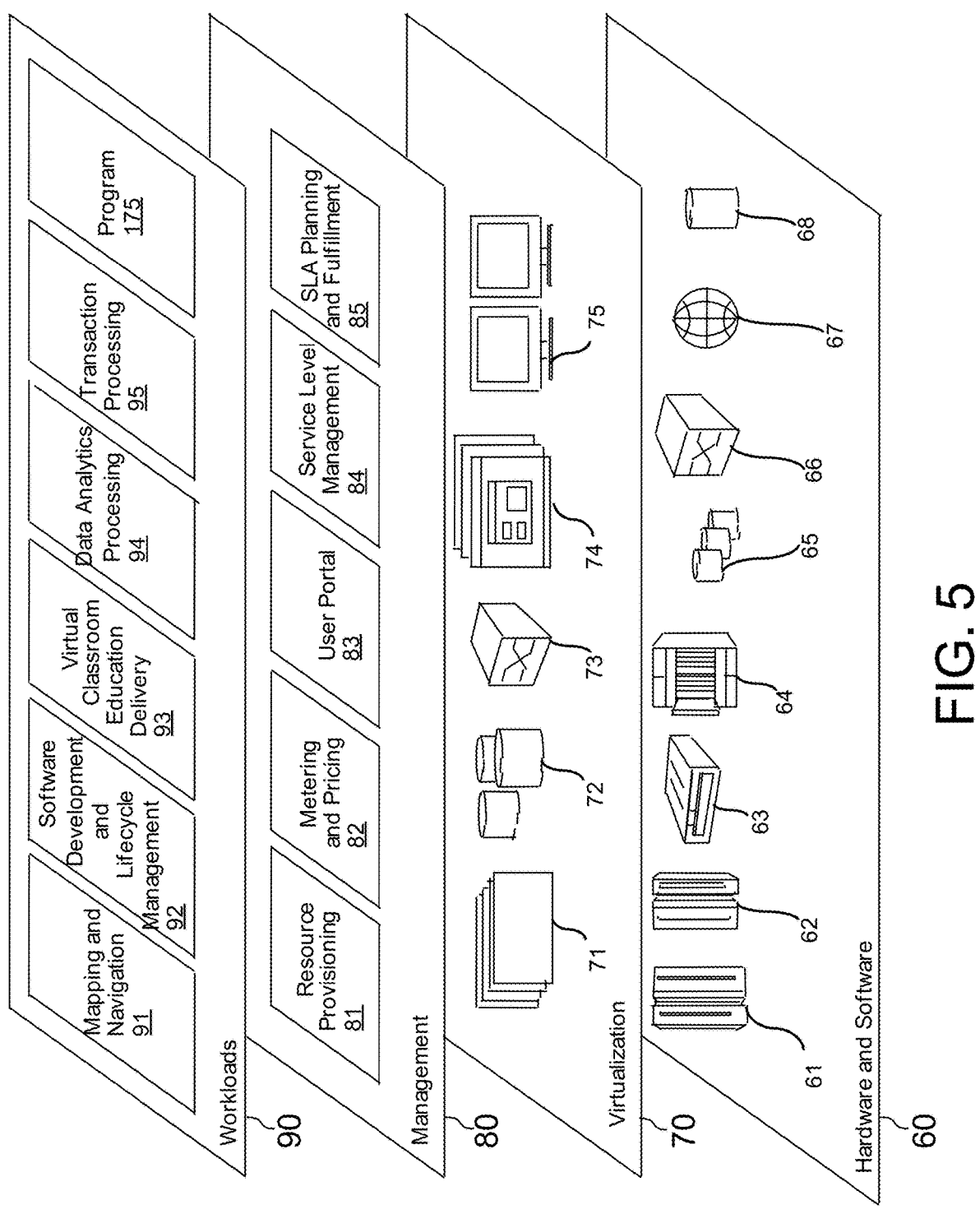
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data governance and XAI program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:

receiving over a network, by one or more computer processors, input data as a ledger entry comprising a digital signature of a user and a public key of the user, for an ML model;

processing, by the one or more computer processors, the input data using the ML model, yielding an initial result;

adding, by the one or more computer processors, the input data and initial result to ML model training data, yielding modified training data;

creating, by the one or more computer processors, a new version of the ML model using the modified training data;

generating, by the one or more computer processors, an explainable artificial intelligence (XAI) explanation for the initial result using the ML model, the XAI explanation comprising ranked relative weightings of a contribution of the input data to the initial result and how the input data contributed to the initial result;

adding, by the one or more computer processors, a first block to a distributed ledger in persistent storage, the first block comprising the input data, stakeholder tags for the input data, the initial result, the XAI explanation, the ML model version, the ML model data structure, and a link to training data for the ML model, wherein the training data resides in previous distributed ledger blocks, wherein the ML model version, ML model data structure and training data for the ML model enable recreation of the ML model;

adding, by the one or more computer processors, a second block to the distributed ledger in persistent storage, the second block comprising the new version of the ML model, a new ML model data structure for the new version of the ML model, and a link to the modified training data for the new version of the ML model, providing over the network, by the one or more computer processors, an output including the initial result and the XAI according to the stakeholder tags;

receiving, by the one or more computer processors, a result validation request relating to the input data;

retrieving, by the one or more computer processors, the input data, the initial result, and the ML model data structure from the first block;

processing, by the one or more computer processors, the input data using the ML model data structure, yielding a validation result; and providing, by the one or more computer processors, the initial result and the validation result as an output.

2. The computer implemented method according to claim 1, further comprising:

providing, by the one or more computer processors, an ML model explanation as an output.

3. The computer implemented method according to claim 1, further comprising:

providing, by the one or more computer processors, an ML model explanation as an output; and wherein the first block further comprises the ML model explanation.

4. The computer implemented method according to claim 1, wherein the first block further comprises an ML model version label.

5. The computer implemented method according to claim 1, further comprising:

updating, by the one or more computer processors, the ML model using the input data and result, yielding a new ML model version; and adding, by the one or more computer processors, a second block to the distributed ledger wherein the second block comprises a label associated with the new ML model version, the input data, the initial result, a new ML model data structure, and a link to training data for a previous version ML model.

6. The computer implemented method according to claim 1, further comprising linking, by the one or more computer processors, the first block and a user associated with the input data through a distributed ledger entry, wherein the distributed ledger entry enables the user to request validation of the initial result.

7. A computer program product comprising one or more computer readable storage devices and collectively stored program instructions on the one or more computer readable storage devices, the stored program instructions comprising:

program instructions to receive input data as a ledger entry comprising a digital signature of a user and a public key of the user, for an ML model over a network;

program instructions to process the input data using the ML model, yielding an initial result;

program instruction to add the input data and initial result to ML model training data, yielding modified training data;

program instructions to create a new version of the ML model using the modified training data;

program instructions to generate an explainable artificial intelligence (XAI) explanation for the initial result using the ML model, the XAI explanation comprising ranked relative weightings of a contribution of the input data to the initial result and how the input data contributed to the initial result;

program instructions to add a first block to a distributed ledger in persistent storage, the first block comprising the input data, stakeholder tags for the input data, the initial result, the XAI explanation, the ML model version, the ML model data structure, and a link to training data for the ML model, wherein the training data resides in previous distributed ledger blocks, wherein the ML model version, data structure and training data enable recreation of the ML model;

program instructions to add a second block to the distributed ledger in persistent storage, the second block comprising the new version of the ML model, a new ML model data structure for the new version of the ML model, and a link to the modified training data for the new version of the ML model, program instructions to provide, over the network, an output including the initial result and the XAI according to the stakeholder tags;

program instructions to receive a result validation request relating to the input data;

program instructions to retrieve the input data, the initial result, and the ML model data structure from the first block;

program instructions to process the input data using the ML model, yielding a validation result; and program instructions to provide the initial result and the validation result as an output.

8. The computer program product according to claim 7, the stored program instructions further comprising:

program instructions to provide an ML model explanation as an output.

9. The computer program product according to claim 7, the stored program instructions further comprising:

program instructions to provide an ML model explanation as an output; and wherein the first block further comprises the ML model explanation.

10. The computer program product according to claim 7, wherein the first block further comprises an ML model version label.

11. The computer program product according to claim 7, the stored program instructions further comprising:

program instructions to update the ML model using the input data and result, yielding a new ML model version; and program instructions to add a second block to the distributed ledger wherein the second block comprises the new ML model version, the input data, the initial result, a new ML model data structure, and a link to training data for a previous version ML model.

12. The computer program product according to claim 7, the stored program instructions further comprising program instructions to link the first block and a user associated with the input data through a distributed ledger entry, wherein the distributed ledger entry enables the user to request validation of the initial result.

13. A computer system comprising:

one or more computer processors;

one or more computer readable storage devices; and stored program instructions on the one or more computer readable storage devices for execution by the one or more computer processors, the stored program instructions comprising:

program instructions to receive input data as a ledger entry comprising a digital signature of a user and a public key of the user, for an ML model over a network;

program instruction to add the input data and initial result to ML model training data, yielding modified training data;

program instructions to create a new version of the ML model using the modified training data;

program instructions to process the input data using the ML model, yielding an initial result;

program instructions to generate an explainable artificial intelligence (XAI) explanation for the initial result using the ML model, the XAI explanation comprising ranked relative weightings of a contribution of the input data to the initial result and how the input data contributed to the initial result;

program instructions to add a first block to a distributed ledger in persistent storage, the first block comprising the input data, stakeholder tags for the input data, the initial result, the XAI explanation, the ML model version, the ML model data structure, and a link to training data for the ML model, wherein the training data resides in previous distributed ledger blocks, wherein the ML model version, data structure and training data enable recreation of the ML model;

program instructions to add a second block to the distributed ledger in persistent storage, the second block comprising the new version of the ML model, a new ML model data structure for the new version of the ML model, and a link to the modified training data for the new version of the ML model, program instructions to provide, over the network, an output including the initial result and the XAI according to the stakeholder tags;

program instructions to receive a result validation request relating to the input data;

program instructions to retrieve the input data, the initial result, and the ML model data structure from the first block;

program instructions to process the input data using the ML model, yielding a validation result; and program instructions to provide the initial result and the validation result as an output.

14. The computer system according to claim 13, the stored program instructions further comprising:

program instructions to provide an ML model explanation as an output.

15. The computer system according to claim 13, the stored program instructions further comprising:

program instructions to provide an ML model explanation as an output; and wherein the first block further comprises the ML model explanation.

16. The computer system according to claim 13, stored program instructions further comprising:

program instructions to update the ML model using the input data and result, yielding a new ML model version; and program instructions to add a second block to the distributed ledger wherein the second block comprises the new ML model version, the input data, the initial result, a new ML model data structure, and a link to training data for a previous version ML model.

17. The computer system according to claim 13, the stored program instructions further comprising program instructions to link the first block and a user associated with the input data through a distributed ledger entry, wherein the distributed ledger entry enables the user to request validation of the initial result.

* * * * *